United States Patent [19]

Frianeza-Kullberg

[11] Patent Number: 4,855,059

[45] Date of Patent: Aug. 8, 1989

[54] PURIFICATION OF BRINES WITH HYDROUS METAL OXIDE ION EXCHANGERS

[76] Inventor: Teresita C. Frianeza-Kullberg, 2357 Amity Ave., Gastonia, N.C. 28054

[21] Appl. No.: 221,149

[22] Filed: Jul. 19, 1988

Related U.S. Application Data

[63] Continuation-in-part of Ser. No. 850,464, Apr. 11, 1986, abandoned.

[51] Int. Cl.$^4$ .............................................. B01D 15/04
[52] U.S. Cl. .................................... 210/670; 210/679; 210/687; 423/179.5; 423/181
[58] Field of Search ....................... 210/670, 679, 687; 423/157, 179.5, 181

[56] References Cited

U.S. PATENT DOCUMENTS

| | | | |
|---|---|---|---|
| 3,382,034 | 5/1968 | Kraus | 23/50 |
| 4,405,574 | 9/1983 | Lee et al. | 521/28 |
| 4,569,765 | 2/1986 | Beale | 210/687 |

*Primary Examiner*—Ivars Cintins

[57] ABSTRACT

A process for the substantial removal of calcium or other divalent ions from natural or industrial brines containing high levels of another ion comprising (a) adjusting the pH of the brine to an alkaline pH of 9 to 11 with an alkaline material; and (b) contacting the brine for at least 5 minutes with an ion exchanger consisting essentially of a hydrous oxide selected from hydrous oxides of zirconium, titanium, tin, molybdenum, tungsten, thorium, niobium or tantalum and mixed hydrous oxides of these aforementioned metals at a temperature between ambient and about the boiling point of the brine being treated.

10 Claims, No Drawings

PURIFICATION OF BRINES WITH HYDROUS METAL OXIDE ION EXCHANGERS

This application is a continuation-in-part of Ser. No. 850,464 filed Apr. 11, 1986, now abandoned.

This invention concerns removal of calcium and other divalent ions from natural or industrial brines.

The chlor-alkali and lithium industries utilize concentrated brines of sodium chloride, lithium chloride, lithium sulfate and other chemicals in the manufacture of chlorine, sodium hydroxide, lithium hydroxide, lithium metal and other products. The presence of minor amounts of unwanted ions such as calcium, magnesium, strontium, barium and the like causes a variety of processing problems in commercial operations. It is therefore desirable to remove the unwanted ions from the brines.

Separation of unwanted, problem causing ions from process streams and desired products has therefore been the subject of many investigations, which have resulted in a large volume of published information including patents. One commonly used separation technique is recrystallization. Multiple recrystallizations are often employed to effect separation of a purified product. This is done for example in the lithium industry where lithium hydroxide is subjected to multiple recrystallizations to reduce the calcium ion concentration from about 125 parts per million (ppm) by weight calcium ion to lower levels sometimes to 20 to 25 ppm of calcium. Lower and even zero contamination is desirable but not generally achieved by repeated recrystallizations of the product.

The use of inorganic ion exchangers to separate cations or anions from aqueous solutions has been known for a long time. The use and study of hydrous oxides and insoluble salt ion exchangers in separation techniques may have started with the discovery in 1943 that the insoluble compound zirconium phosphate may be used to separate uranium and plutonium from fision products. While a large number of ion exchange compounds have been studied, particular attention has been paid to hydrous oxides and zirconium phosphate. A book surveying this technology, *Inorganic Ion Exchangers* by C. B. Amphlett, discusses hydrous oxides and zirconium phosphate at length.

Kraus in U.S. Pat. No. 3,382,034 patented May 7, 1968, disclosed hydrous oxide ion exchangers containing zirconium and other metals. It is noted in column 7, line 56 and following that "the oxides containing a specific component were found to show a trend to higher selectivities between elements of a given charge type with higher acidity. They tend to lose this selectivity in the less acidic solutions where the oxides may exist principally in salt forms."

The use of microporous anion exchange resin composites having deposited in situ the reaction product of polymeric amorphous hydrous zirconium hydroxide and a source of PO4 ions is disclosed by Lee & Bauman in U.S. Pat. No. 4,405,574. The Lee & Bauman anion exchange composite is used to remove alkaline earth metal ions such as magnesium and/or calcium from alkali metal brines such as sodium chloride. It is stated but not demonstrated that these ion exchangers may be used on natural brines such as sea water or mineral brines such as lithium chloride, calcium chloride, or an alkali metal salt brine which comes from ore dressing or leaching mineral dressing and the like. It is claimed that the composite exhibits a high affinity and strong preference for magnesium and/or calcium ions.

The particulate microporous anion exchange resin composites containing a zirconium phosphate disclosed in U.S. Pat. No. 4,405,574, discussed above, disclosed in col. 3, lines 12-15, that greater than 99% of calcium is removed from a 26% brine solution containing about 0.7 grams of calcium per liter. This is a reduction of from about 681 ppm of calcium to around 7 ppm of calcium. Although this level of calcium is low, it is not adequate for increasingly stringent requirements in the production of lithium metal where there is an increasing demand for product with impurities approaching zero. Similarly, in the electrolysis of sodium chloride brines, even small amounts of calcium result in slow build up of calcium hydroxide in electrolysis cells which must be cleaned to remove this calcium build up. Thus, a process is needed to reduce calcium in brines to near 0 ppm.

In accordance with the present invention, there is provided a process for the removal of calcium ions or other divalent ions from industrial or natural brines containing high levels of another, monovalent, ion by treating the brine under alkaline conditions with an ion exchanger selected from hydrous oxides of zirconium, titanium, tin, molybdenum, tungsten, thorium, niobium or tantalum and mixed hydrous oxides of these aforementioned metals at a temperature between ambient and about the boiling point of the brine. The pH of the brine should be made sufficiently high to allow cation exchange to take place but preferably a pH of 9 to 11 is employed.

Zirconium carbonate, zirconium hydroxide, zirconium orthosulfate and zirconyl chloride octahydrate are preferred salts used to prepare exchangers for removing calcium from lithium brines such as lithium chloride solutions. This does not preclude use of other zirconium compounds such as zirconium basic sulfate, zirconium acetate, zirconium oxynitrate, zirconium hydroxychloride, and the like, from use in preparing cation exchangers in the process of the present invention. These compounds are commercially available, a feature that makes these compounds suitable for use in industrial processes.

The hydrous oxide ion exchangers and/or precursors used in the present invention may be added to the brine at temperatures between ambient and about the boiling point of the brine, with agitation, which is maintained for at least 5 minutes. The exchange kinetics are very fast so that use of a large excess of the exchange does not significantly reduce the time over that achieved by a stoichiometric amount of exchanger. The hydrous oxide ion exchangers can also be used in a supported form; typically, the support is a resin, a permeable membrane or an inorganic substrate. Temperature has a small effect on exchange rate but does increase slightly with increasing brine temperatures. This does not hasten greatly the exchange time to remove divalent ions from the brine. As used herein brine means a solution of alkali or alkaline earth metal salts in solution in water and whose salt concentration can vary up to nearly saturated. These salts include, among others, alkali metal or alkaline earth chlorides, bromides, sulfates, hydroxides, nitrates, and the like and natural brines. Brine sources include natural brines as Chilean brines, geothermal brines, sea water, mineral brines such as LiCl brine, KCl brine, other alkali metal salt brines and industrial brines such as those recovered from ore leaching, mineral dressing, and the like.

The present process must be conducted under alkaline conditions. While it is only required that the solution should have sufficiently high pH to allow cation exchange to take place, it is preferred to have the pH of the brine in the range of 9 to 11 especially when the hydrous oxide is prepared in situ. The process is useful at alkaline pH levels below 9, but it takes longer to remove the calcium; pH values above 11 can also be employed but process improvements do not justify the costs of higher pH levels.

Surprisingly, in the present process for removing calcium ions from lithium chloride brine, it is very desirable to operate within the high pH range of 9 to 11. It is unexpected that this would be so in view of U.S. Pat. No. 4,405,574 which in the paragraph bridging pages 2 and 3 states that an important operating variable of their process is the pH of the brine. As measured by glass electrodes, the Lee & Bauman process claims a working pH in the range of about 5 to about 8.5, implying no preference between slightly basic or slightly acidic conditions.

In the preferred method of the present invention for removing calcium ions from lithium brines, lithium hydroxide is added to adjust the brine alkalinity to a pH value between 9 and 11. Use of high purity lithium hydroxide for the pH adjustment avoids introduction of unwanted contaminants in this step. Ammonium hydroxide is also preferred since the ammonium ion is easy to remove by conventional means. The zirconium compound is added, and the resultant slurry stirred at a temperature ranging from ambient to 80° C. for a time period of five to fifteen minutes to several hours. Phase separation yields a brine substantially free of calcium and a solid phase of the calcium loaded exchanger. The exchanger can then be regenerated for subsequent reuse as demonstrated in the examples.

Care must be exercised in acid regeneration of the hydrous oxide exchangers. For example, unlike the well-known hydrated zirconium phosphate exchanger which is known to be stable to acidic solutions of 0.1N acid, hydrated zirconium hydroxide is not stable to 0.1N acidic solutions and should be regenerated with no stronger than about 0.02 to 0.03N acid (pH 1.5 to 1.7). When concentrated acid is employed, care must be taken to avoid dissolving the zirconium hydroxide exchanger since such zirconium will be lost in the waste stream thus increasing the overall cost of the exchange process.

A solubility study of zirconium hydroxide in hydrochloric acid of several different concentrations was done. Data from this study is set forth in the Table. The data show, among other things, that use of one normal hydrochloric acid removed 0.13 weight percent (1300 parts per million) of the zirconium.

TABLE

Solubility of Zirconium Hydroxide in Hydrochloric Acid of Various Concentrations

| Experiment Number | HCl Normality | $Zr^{4+}$, ppm in Filtrate |
|---|---|---|
| 1 | 0.00001 | <0.2 |
| 2 | 0.001 | <0.2 |
| 3 | 0.02 | <0.2 |
| 4 | 0.1 | 16 |
| 5 | 0.2 | 11 |
| 6 | 1.0 | 1,300 |
| 7 | 4.0 | 10,000 |
| 8 | 6.0 | 16,400 |

Calcium analysis in the following illustrative examples were performed by atomic absorption spectroscopy. The lowest detectable amount of this technique is in the range of 1 to 2 ppm for calcium.

The present invention will be understood more fully from the description which follows and from the accompanying examples, in which particular embodiments of the invention are shown. It is to be understood at the outset, however, that persons of skill in the appropriate art may modify the invention here described while still achieving the favorable results of this invention.

EXAMPLE 1

A 0.60 gram sample of zirconium hydroxide in the form of a fine powder of about 150 micron size (sieve No. 100) was placed in a 200 milliliter solution of a 26% lithium chloride brine containing 24 ppm of calcium ions. The pH of the solution was adjusted to 10 by the addition of a small amount of lithium hydroxide and then stirred for two hours at 70° C. and filtered. The calcium ion content of the filtrate was 2 ppm.

EXAMPLE 2

Example 1 was repeated except that the solution was kept at room temperature (ca. 21°–22° C.). The calcium ion content of the filtrate was 2 ppm.

EXAMPLE 3

Example 1 was repeated using zirconium basic carbonate in place of zirconium hydroxide. The zirconium basic carbonate had a particle size of about 150 microns. The calcium ion content of the filtrate was 2 ppm.

EXAMPLE 4

A 100 milliliter alkaline solution (pH 11) of 36% lithium chloride containing 120 ppm of calcium ion was stirred with 15 milliliters of a 20% zirconyl chloride octahydrate solution for 5½ hours at room temperature (22° C.). The calcium ion content of the filtrate was 2 ppm and the final pH was 9.

EXAMPLE 5

Lithium hydroxide monohydrate was added to 26% lithium chloride brine containing 19 ppm calcium to adjust the pH to 10. Zirconium hydroxide was then added, and the solution was stirred for 100 minutes at 22° C. Calcium in the filtrate was 1.7 ppm.

EXAMPLE 6

Example 5 was repeated except that the solution was stirred at 45° C. for 100 minutes. Calcium in the filtrate was 1.4 ppm.

EXAMPLE 7

Example 5 was again repeated except that the solution was stirred at 65° C. for 100 minutes. Calcium in the filtrate was 1.5 ppm.

EXAMPLE 8

A 0.90 gram sample of calcium exchanged zirconium hydroxide was slurried with distilled water. Concentrated hydrochloric acid was added to the solution until a pH of 1.5–1.7 was attained. The resulting filtrate contained all the calcium previously adsorbed on the ion exchanger. Reuse of this solid gave a 97% calcium uptake from 26% lithium chloride brine. Several successive reuses and regenerations showed no decrease in the uptake of calcium.

EXAMPLE 9

A 0.60 gram sample of calcium exchanged zirconium basic carbonate was treated as in Example 8. No decrease in calcium uptake was observed after several successive reuses and regenerations.

EXAMPLE 10

A 200 ml solution of 11.3 wt.% lithium chloride containing 1880 ppm Ca and 520 ppm Mg was made alkaline (pH 10) by adding lithium hydroxide monohydrate and then treated with 6 grams of zirconium hydroxide. The mixture was stirred at 70° C. for 90 minutes. Final calcium was 13 ppm (99.3% Ca uptake), and final magnesium was 0.2 ppm (100% Mg uptake). Final pH was 10.2.

EXAMPLE 11

A 200 ml solution of 9% lithium hydroxide containing 61 ppm calcium ion was treated with 0.4 grams of zirconium hydroxide (particle size about 150 microns). The mixture was stirred in a wrist action shaker at 70° C. for fifteen minutes. An 85% calcium ion uptake was obtained.

EXAMPLE 12

A 100 ml solution of 5% lithium hydroxide containing 30 ppm calcium ion was treated with 0.2 gram zirconium hydroxide. The mixture was stirred in a shaker at 70° C. for 100 minutes. A 97% calcium uptake was obtained (1 ppm Ca).

EXAMPLE 13

A 200 ml solution of 9.6 wt.% lithium hydroxide containing 39 ppm Ca was treated with 0.82 gram zirconium hydroxide. The solution was stirred at room temperature for 100 minutes. Calcium in the filtrate was 3.8 ppm; zirconium was 2.7 ppm. Calcium uptake was 90%.

EXAMPLE 14

A 200 ml solution of 4.8 wt.% lithium hydroxide containing 38 ppm Ca was treated with 0.81 gram of zirconium hydroxide. The mixture was stirred at room temperature for 120 minutes. Calcium uptake was 95%; calcium in the filtrate was 1.9 ppm. Zirconium in the filtrate was 2 ppm.

EXAMPLE 15

A 100 ml solution of 10% lithium sulfate containing 363 ppm calcium ion and 1,678 ppm of magnesium ions was stirred at 70° C. for 100 minutes with 0.53 gram of lithium hydroxide monohydrate and 0.53 gram of zirconium hydroxide. A 75% calcium ion uptake and a 67% magnesium ion uptake was achieved. The final pH was 9.5.

EXAMPLE 16

A 100 ml solution of 10% lithium sulfate containing 432 ppm calcium ion was stirred at 70° C. for 100 minutes with 1 gram of zirconium orthosulfate and 0.6 gram of lithium hydroxide monohydrate. An 82% calcium ion uptake was obtained. Final pH was 11.

What is claimed is:

1. A process for separating calcium ions from natural or industrial brines comprising (a) adjusting the pH of the brine to pH 9 to 11; and (b) contacting the alkaline brine with an ion exchanger consisting essentially of a hydrous oxide of zirconium for a period of time sufficient to remove the desired quantity of calcium ions from the brine.

2. The process as defined in claim 1 wherein the ion exchanger is substantially insoluble in concentrated brines.

3. The process of claim 1 wherein contact time is varied from fifteen minutes to several hours.

4. The process of claim 1 wherein calcium is removed from brines containing other alkali or alkaline earth salts.

5. The process of claim 4 wherein calcium is removed from industrial or natural brines containing alkali metal or alkaline earth sulfates, hydroxides, nitrates, bromides or chlorides.

6. A process for removal of calcium ions from lithium brine comprising adjusting the pH of the lithium brine to pH 9 to 11 and contacting the alkaline lithium brine with a hydrous oxide ion exchanger consisting essentially of zirconium hydroxide for a period of time sufficient to remove the desired quantity of calcium ions from the brine.

7. The process of claim 6 wherein the zirconium hydroxide is produced in the alkaline lithium brine by adding to the brine a zirconium salt selected from zirconium basic carbonate, zirconium orthosulfate, zirconyl chloride octahydrate, zirconium acetate, zirconium basic sulfate, zirconium oxynitrate and zirconium hydroxychloride to produce in situ the hydrous oxide cation exchanger consisting essentially of zirconium hydroxide.

8. The process of claim 6 or 7 wherein the ion exchanger is regenerated with acid whose strength does not exceed 0.03 normal and which regenerated ion exchanger is reintroduced into the process.

9. The process of claim 6 or 7 wherein the hydrous oxide ion exchanger is supported by a resin, a permeable membrane or an inorganic substrate.

10. The process of claim 1 or 6 wherein the temperature is between ambient temperature and 80° C.

* * * * *

UNITED STATES PATENT AND TRADEMARK OFFICE
CERTIFICATE OF CORRECTION

PATENT NO. : 4,855,059

DATED : August 8, 1989

INVENTOR(S) : Teresita C. Frianeza-Kullberg

It is certified that error appears in the above-identified patent and that said Letters Patent is hereby corrected as shown below:

On the title page, item [76], should read:
-- Inventor: Teresita C. Frianeza-Kullberg, Gastonia, N.C.--
On the title page, insert:
-- Assignee: Lithium Corporation of America, Gastonia, North Carolina--

Signed and Sealed this

Twenty-second Day of January, 1991

Attest:

HARRY F. MANBECK, JR.

*Attesting Officer*　　　　*Commissioner of Patents and Trademarks*